United States Patent
Mazza

(10) Patent No.: US 11,822,998 B2
(45) Date of Patent: Nov. 21, 2023

(54) ELECTRONIC TAG

(71) Applicant: FriSense Limited, London (GB)

(72) Inventor: Marco Mazza, Courtaman (CH)

(73) Assignee: FriSense Limited, London (GB)

( * ) Notice: Subject to any disclaimer, the term of this patent is extended or adjusted under 35 U.S.C. 154(b) by 0 days.

(21) Appl. No.: 17/423,399

(22) PCT Filed: Jan. 17, 2020

(86) PCT No.: PCT/GB2020/050099
§ 371 (c)(1),
(2) Date: Jul. 15, 2021

(87) PCT Pub. No.: WO2020/148550
PCT Pub. Date: Jul. 23, 2020

(65) Prior Publication Data
US 2022/0108090 A1   Apr. 7, 2022

(30) Foreign Application Priority Data

Jan. 17, 2019  (GB) .................................... 1900667
Nov. 19, 2019  (GB) .................................... 1916833

(51) Int. Cl.
*G06K 7/10*    (2006.01)
*G06K 19/07*   (2006.01)

(52) U.S. Cl.
CPC ..... *G06K 7/10366* (2013.01); *G06K 19/0723* (2013.01)

(58) Field of Classification Search
CPC .................. G06K 7/10366; G06K 19/0723
(Continued)

(56) References Cited

U.S. PATENT DOCUMENTS

2005/0150944 A1    7/2005  Melick et al.
2006/0011449 A1*   1/2006  Knoll ................. G07D 7/01
                                              194/214
(Continued)

FOREIGN PATENT DOCUMENTS

CN       108182566 A    6/2018
DE    102013022310 A1   2/2015
(Continued)

OTHER PUBLICATIONS

May 27, 2020—(WO) International Search Report and Written Opinion—App PCT/GB2020/050099.
(Continued)

*Primary Examiner* — Allyson N Trail
(74) *Attorney, Agent, or Firm* — Banner & Witcoff, Ltd.

(57) ABSTRACT

A capacitive coupled radio frequency identification, RFID, tag and method for reading the tag, the tag comprising a semiconductor substrate having a first planar surface and a second planar surface distal from the first planar surface. A metallic pad formed on the first planar surface of the semiconductor substrate. A circuit formed on the semiconductor substrate and electrically connected to the metallic pad and the second planar surface of the semiconductor substrate, the circuit configured to respond to a radio frequency, RF, input signal by providing a data signal encoded by varying an impedance between the metallic pad and the second planar surface of the semiconductor substrate.

22 Claims, 6 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2008/0117048 A1 | 5/2008 | Rachwalski et al. | |
| 2008/0272886 A1* | 11/2008 | Tiller et al. | |
| 2013/0186959 A1* | 7/2013 | Smith | G06K 19/0715 235/492 |
| 2013/0271265 A1 | 10/2013 | Finn | |
| 2014/0016719 A1 | 1/2014 | Manku | |
| 2018/0129834 A1 | 5/2018 | Nikitin et al. | |
| 2018/0268178 A1* | 9/2018 | Sugimoto | G06K 19/07786 |
| 2020/0327389 A1* | 10/2020 | Yamamoto | H01Q 1/2225 |
| 2022/0108090 A1* | 4/2022 | Mazza | G06K 19/0723 |

FOREIGN PATENT DOCUMENTS

| | | |
|---|---|---|
| EP | 1862953 A2 | 12/2007 |
| EP | 1862953 A3 | 2/2008 |
| EP | 2372598 A1 | 10/2011 |
| EP | 2431908 A1 | 3/2012 |
| EP | 2888181 B1 | 3/2017 |
| GB | 2576319 A | 2/2020 |
| RU | 2386169 C2 | 4/2010 |
| WO | 2019008159 A1 | 1/2019 |

OTHER PUBLICATIONS

Jul. 11, 2019—(GB) Search Report—APP 1900667.5.
Sep. 7, 2020—(GB) Examination Report—APP 2011773.5.
Hideyuki Noda and Mitsuo Usami, "0.075 x 0.075mm2 Ultra-Small 7.5?m Ultra-Thin RFID-Chip Mounting Technology", 978-14244-2231-9/08, 2008 IEEE, 2008 Electronic Components and Technology Conference, pp. 366 to 370.
Mitsuo Usami, "Powder RFID Chip Technology", Hitachi, Ltd., 978-1-4244-2342-2/08, 2008 IEEE, pp. 1220 to 1223.
Mitsuo Usami, Hisao Tanabe, Akira Sato, Isao Sakama, Yukio Maki, Toshiaki Iwamatsu, Takashi Ipposhi, Yasuo Inoue, "26.6—A 0.05x0. 05mm2 RFID Chip with Easily Scaled-Down ID-Memory", Hitachi, ISSCC 2007/Session 26/Non-Volatile Memories/26.6, 1-4244-0852-0/07, 2007 IEEE, pp. 482 to 483.

* cited by examiner

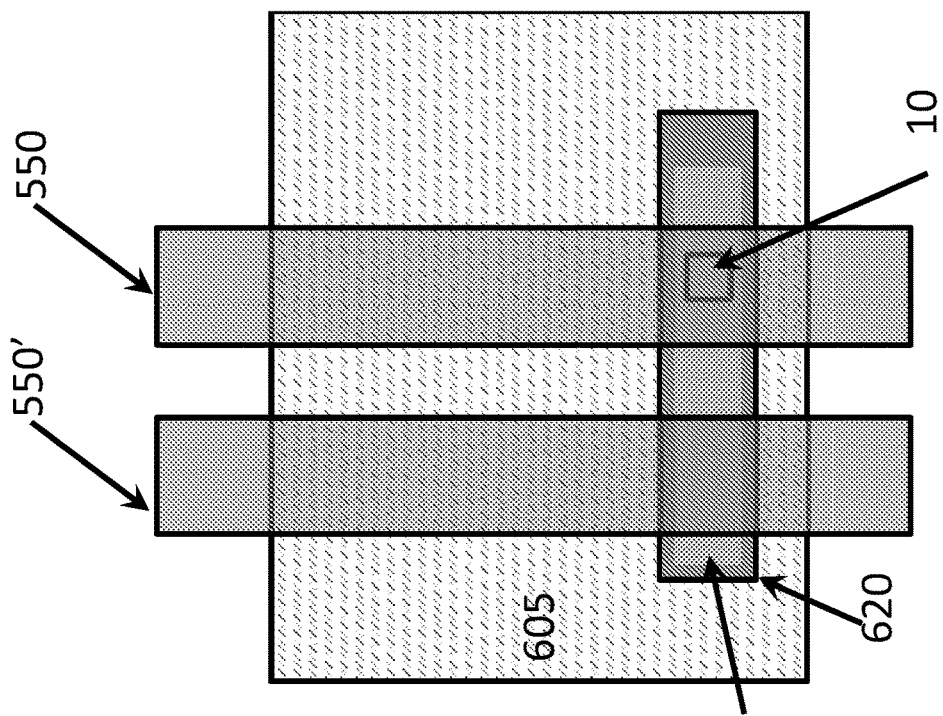
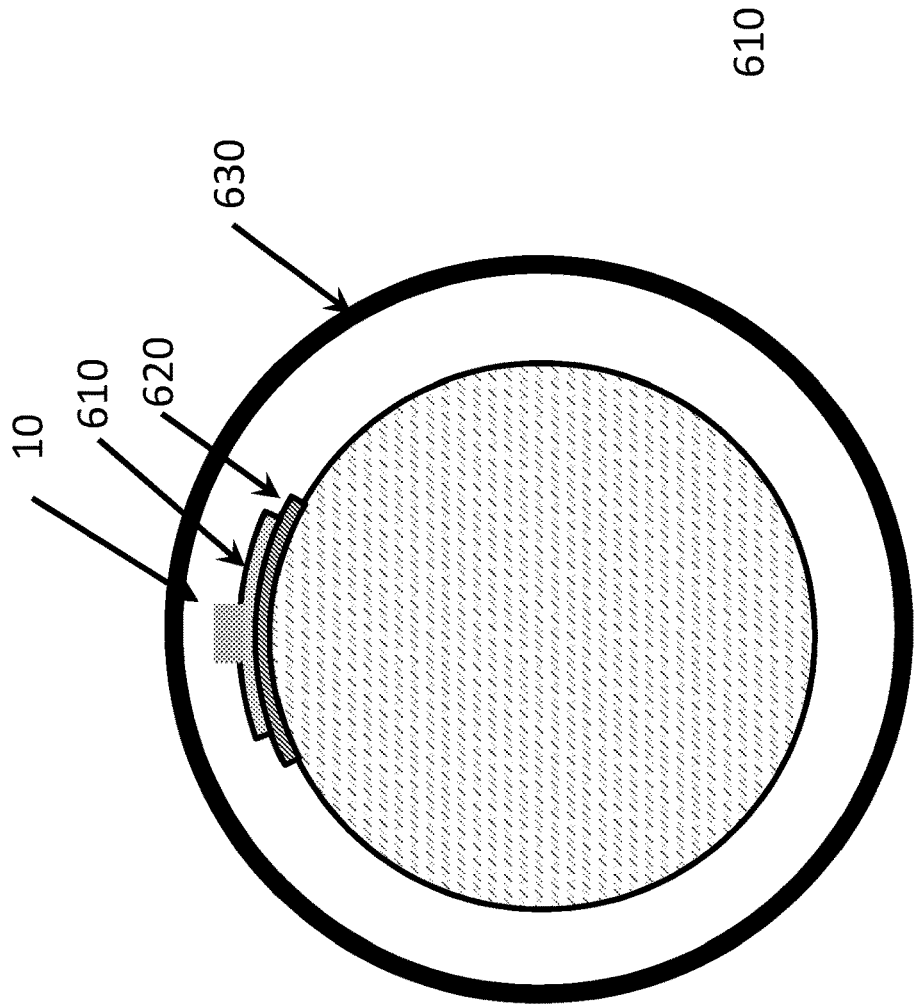
Fig. 6b
Fig. 6a

ELECTRONIC TAG

CROSS-REFERENCE TO RELATED APPLICATIONS

This application is a U.S. National Stage application under 35 U.S.C. § 371 of International Application PCT/GB2020/050099 (published as WO 2020/148550), filed Jan. 17, 2020, which claims the benefit of priority to Applications GB 1900667.5, filed Jan. 17, 2019, and GB 1916833.5, filed Nov. 19, 2019. Benefit of the filing date of each of these prior applications is hereby claimed. Each of these prior applications is hereby incorporated by reference in its entirety.

FIELD OF THE INVENTION

The present invention relates to a capacitive coupled RFID tag and a method for its operation.

BACKGROUND OF THE INVENTION

Capacitive-coupled tags (CC-tag or CCT) provide increased security whilst providing authenticity and tracking functionality. This technology has widespread use for tracking artefacts where security and authenticity is paramount. However, when the size of the CC-tag can be reduced and its efficiency increased then the number of potential applications increases.

Other types of RFID tags exist and these can include antennas for receiving RF signals from a reader to power the device and to respond with a signal using the same antenna. However, use of such antennas can increase the size of the devices and increase the complexity of manufacture and so limit their applications. Furthermore, such antennas can introduce a point of failure resulting in less robust devices. CC-tags do not use an antenna but interact with the RF signal provided by a reader by altering their impedance, which affects the electric field generated by the reader and which in turn is detected by the reader. When such impedance changes are modulated then this modulation can be decoded to provide data (e.g. an identifier of the CC-tag).

"0.075×0.075 mm$^2$ Ultra-Small 7.5 µm Ultra-Thin RFID-Chip Mounting Technology", Hideyuki Noda and Mitsuo Usami, 978-14244-2231-9/08, 2008 IEEE, 2008 Electronic Components and Technology Conference, pages 366 to 370 describes the manufacture of small RFID chips that include an antenna. However, the manufacture of such RFID chips, especially on a large scale, provides technological difficulties, which can reduce the yield in the manufacturing process and increase failure rates.

"Powder RFID Chip Technology", Mitsuo Usami, Hitachi, Ltd., 978-1-4244-2342-2/08, 2008 IEEE, pages 1220 to 1223 describes another small RFID tag and method of its manufacture, which again requires an antenna structure placed on the RFID chip. This limits the size of the tag to a lower limit.

"26.6—A 0.05×0.05 mm$^2$ RFID Chip with Easily Scaled-Down ID-Memory", Mitsuo Usami, Hisao Tanabe, Akira Sato, Isao Sakama, Yukio Maki, Toshiaki Iwamatsu, Takashi Ipposhi, Yasuo Inoue, Hitachi, ISSCC 2007/SESSION 26/NON-VOLATILE MEMORIES/26.6, 1-4244-0852-0/07, 2007 IEEE, pages 482 to 483 describes an RFID chip that has a unique IP address and that uses double-surface electrodes.

A further requirement is that RFID tags can be read in the presence of other RFID tags. This can be particularly difficult for very small RFID tags that may be embedded in many separate items stacked or placed close together.

Therefore, there is required a capacitive coupled tag and method of operation that overcomes these problems.

SUMMARY OF THE INVENTION

A capacitive-coupled RFID tag (CC-tag or RFID tag) is provided that is thin (e.g. has a thickness of 100 µm, 50 µm or less) is formed on a semiconductor substrate such as a silicon, having one surface covered in a metal layer (e.g. gold on aluminium) and an opposite surface being a bare semiconductor surface, which together act as a tuneable impedance. A circuit or chip (e.g. an integrated circuit, IC) on or within the semiconductor substrate controls a device and varies its electrical properties as seen (electrically) from an external reader that applies an electric field through the CC-tag, typically using electrodes. The CC-tag is powered by the externally applied RF electric field and responds to its presence by varying its electrical properties (in particular, its impedance). The CC-tag capacitively couples to the reader and the IC modulates its electrical properties to encode a data signal, which is decoded by the reader. The electrical properties are altered by changing the impedance between the metal layer and the opposite semiconductor layer.

When more than one or a stack of such CC-tags are placed within the electric field generated by the reader, then only one of the CC-tags is configured to respond. In an example implementation, the remaining CC-tags may reduce their impedance (e.g. statically) by, for example, applying a short circuit between the metal surface and the opposite semiconductor surface, so that each CC-tags in turn and in isolation can respond and provide its output signal by modulating the RF input signal.

There is also provide a method of manufacturing the capacitive-coupled RFID tag by providing a semiconductor substrate (e.g. silicon) having opposing planar surfaces, applying a metallic layer to one of the planar surfaces and forming the circuit described throughout this description (e.g. a CMOS circuit) on or within the other planar surface (e.g. using lithographic techniques). Preferably, the thickness (i.e. distance between the opposing planar surfaces) is equal to or less than 50 µm (or 25 µm, 100 µm, or 150 µm). The substrate may be square, rectangular or another shape. Preferably, the substrate and resulting device is between 50 and 700 µm wide and/or long.

Application of these concepts includes but is not limited to banknotes, visas, stamps, official documents, holograms, foils, cigarettes and tobacco products of any kind (e.g. standard cigarettes and electronic cigarettes), bottles, labels, food, food packaging, tablets, and other pharmaceutical products (including their coatings and packaging) and other types of packaging that require such small and micron-thin solutions. A CC-tag may be embedded or bonded to such items.

Against the previously described background and in accordance with a first aspect there is provided a capacitive coupled radio frequency identification, RFID, tag (e.g. a CC-tag) comprising:
- a semiconductor substrate having a first planar surface and a second planar surface distal from the first planar surface;
- a metallic pad formed on the first planar surface of the semiconductor substrate;
- a circuit formed on the semiconductor substrate and electrically connected to the metallic pad and the second planar surface of the semiconductor substrate, the circuit configured to respond to a radio frequency, RF, input signal by providing a data signal encoded by varying an impedance between the metallic pad and the second planar surface of the semiconductor substrate. Having one side providing a metal pad and the other having a semiconductor surface reduces the complexity in manufacture (for example, over CC-tags that may have metal pads on each side) as the semiconductor surface is provided by the substrate, whilst allowing the opposite surfaces to provide a capacitance that can be varied by changing the device impedance between the surfaces. The planar surfaces may be flat or be curved (e.g. to accommodate a shape of an object that has the tag attached to it) whilst not affecting the function of the tag, for example.

Preferably, the data signal may be encoded by the varying impedance between the metallic pad and the second planar surface of the semiconductor substrate to modulate the RF input signal. This allows the RF input signal to be used both for powering the device and to be decoded by a reader.

Preferably, the RF input signal may be provided by an external reader.

Advantageously, the circuit is further configured to be powered by the RF input signal.

Advantageously, the circuit may be further configured to decode a signal encoded within the RF input signal and further wherein the data signal is provided in response to the decoded signal. The circuit may optionally include a small amount of power storage (e.g. a capacitor) to store the power generated by the RF input signal for a short time.

Optionally, the circuit modulates the RF input signal by varying its frequency, amplitude and/or phase or any other electrical property.

Optionally, the circuit may be formed on or embedded within the second planar surface of the semiconductor substrate.

Optionally, the circuit may be configured to vary the electrical impedance between the metallic pad and the second planar surface of the semiconductor substrate by applying a short circuit between the metallic pad and the second planar surface of the semiconductor substrate.

Optionally, a distance between an outside surface of the metallic pad and the second planar surface of the semiconductor substrate is equal to or less than 50 µm. This may be described as the thickness of the CC-tag. The thickness may alternatively be less than or equal to 10 µm, 25 µm, 100 µm or 150 µm, for example. The CC-tag may have a substantially square or rectangular cross-section, for example.

Optionally, the circuit may be further configured to detect the presence of one or more further capacitive coupled RFID tags (e.g. of the same type) and in response, cease providing the data signal. This prevents collision of signals and allows multiple CC-tags to be read sequentially without needing to have only one CC-tag within range of the reader at a time.

Optionally, the circuit may be configured to cease providing the data signal by applying a short circuit between the metallic pad and the second planar surface of the semiconductor substrate. This effectively makes the "off" CC-tag(s) invisible (electrically) to the reader.

Optionally, the circuit may be configured to cease providing the data signal until the one or more further capacitive coupled RFID tags have provided their data signal.

Optionally, the circuit may be further configured to cease providing the data signal according to an anti-collision (i.e. of their data signals) protocol.

Optionally, the anti-collision protocol may be based on communications between the one or more capacitive coupled RFID tags:
  according to a pre-determined order of response, according to a negotiated response between the one or more capacitive coupled RFID tags, or a random number generator. Such an anti-collision protocol may not be rely on direct communications between CC-tags but these may be through the reader or not rely on communications at all.

Optionally, the first planar surface may be parallel with the second planar surface. Other configurations may be used provided the surfaces give rise to a capacitance.

Optionally, the capacitive coupled RFID tag is flexible. This may include a bending radius of the order of the width or length of the CC-tag. Therefore, the CC-tag may be embedded or attached to a flexible item with less risk of damage.

Optionally, the capacitive coupled RFID tag may further comprise a metallic plate. This may couple an electrode of a reader to a side of the tag not facing the reader.

Therefore, this avoids the need for reader electrodes on opposite sides of the tag.

Optionally, the capacitive coupled RFID tag may further comprise an insulator bonded between the tag and the metallic plate.

Optionally, the insulator may be bonded to the metallic pad of the tag. Bonding may be by adhesive or another suitable method.

Optionally, the insulator may be bonded to the second planar surface of the semiconductor substrate.

Optionally, the metallic plate may be curved. Therefore, the metallic plate may conform to an item, for example a cylindrical or spherical item.

Optionally, the metallic plate may extend beyond at least one edge of the metallic pad and/or the semiconductor substrate.

In accordance with a second aspect, there is provided item having the capacitive coupled RFID tag according to any previous claim embedded within it.

Optionally, a surface of the item is parallel or substantially parallel with the first planar surface of the capacitive coupled RFID tag. This is useful for flat planar and/or flexible objects.

Optionally, the item may be formed from paper, formed from plastics material, is a bank note, a passport, an ID card, a tax stamp, a cigarette, an electronic cigarette, a label, a tablet (e.g. pharmaceutical product), a beverage capsule, a coffee capsule, a tea capsule and/or a legal document.

In accordance with a third aspect, there is provided a method of communicating with a plurality of capacitive coupled RFID tags, the method comprising the steps of:
  applying a radio frequency, RF, input signal to the plurality of capacitive coupled RFID tags;
  responding to the applied RF input by one of the plurality of capacitive coupled RFID tags, by varying its impedance, the varying impedance encoding a data signal;
  detecting a variation in the RF input signal caused by the varying impedance of the one of the plurality of capacitive coupled RFID tags, the variation encoding the data signal;
  decoding the data signal from the variation of the RF input signal;
  the capacitive coupled RFID tags of the plurality of capacitive coupled RFID tags that are not responding reducing their impedance while the one capacitive coupled RFID tags varies its impedance. Other methods of reading the above-mentioned CC-tags may be used.

Optionally, the variation in the RF input signal may be a variation in frequency, amplitude and/or phase.

Preferably, the method may further comprise the step of using an anti-collision protocol to determine which one of the plurality of capacitive coupled RFID tags responds to the radio frequency by varying its impedance.

Optionally, the plurality of capacitive coupled RFID tags may be stacked one above another or otherwise located in proximity to each other.

In accordance with a fourth aspect, there is provided a computer program comprising program instructions that, when executed on a computer cause the computer to perform the methods described above.

In accordance with a fifth aspect, there is provided a computer-readable medium carrying a computer program, as described above.

In accordance with a sixth aspect, there is provided a system comprising:
    any of the one or more capacitive coupled RFID tags described above; and
    a reader comprising an RF signal generator and decoder configured to decode the data signal.
    Optionally, the reader may further comprise:
    a first electrode configured to align with the metallic pad and/or semiconductor substrate of the tag; and
    a second electrode configured to align with a portion of the metallic plate that extends beyond the at least one edge of the metallic pad and/or the semiconductor substrate. This system may incorporate a tag having the metallic plate that extends either/or beyond the substrate or the metallic pad, for example.

Optionally, the metallic plate may be formed from a metallic package of a can, tin, coffee capsule, tea capsule or beverage capsule. Therefore, manufacture of the device can be simplified and the tag can be more effectively used and applied to metallic items.

Optionally, the first electrode and/or the second electrode may be curved. Therefore, the electrodes can conform to a cylindrical or spherical object (e.g. a cigarette or electronic cigarette), for example.

The methods described above may be implemented as a computer program comprising program instructions to operate a computer. The computer program may be stored on a computer-readable medium.

The computer system (e.g. implemented within an integrated circuit) may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which:
FIG. 6a shows a cross-sectional view of the capacitive-coupled RFID tag of FIG. 5 when applied to a cigarette or an electronic cigarette;
FIG. 6b shows a schematic diagram of the cigarette or electronic cigarette of FIG. 6a together with reader electrodes.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
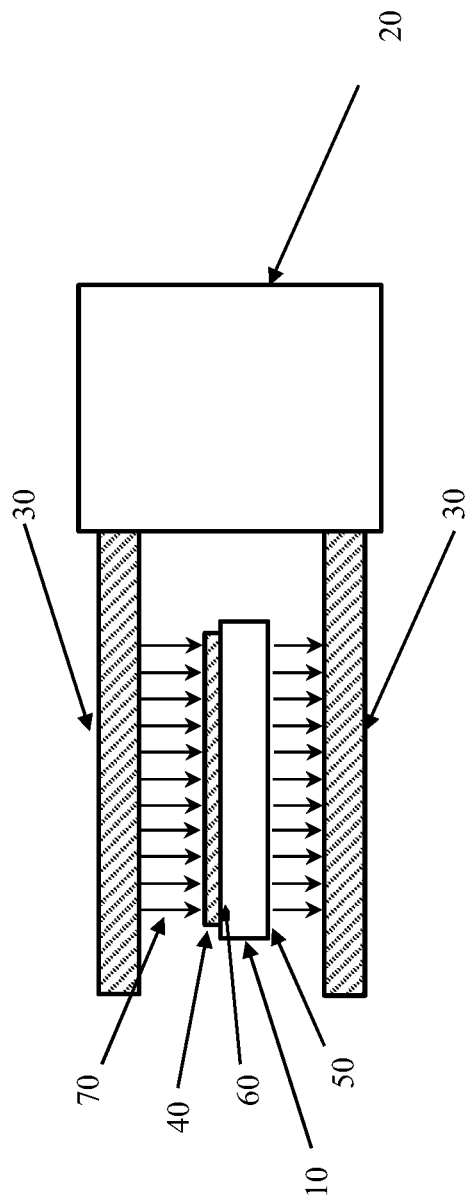
FIG. 1 shows a schematic diagram of a capacitive-coupled RFID tag being read by a reader.

According to an example implementation, a capacitive-couple tag (CC-Tag) is a radio-frequency identification system (RFID) based on a single integrated circuit (IC). In normal applications, an integrated circuit is a piece of mono-crystalline silicon with a single side functionalized through different steps in order to integrate electronic components such as, but not limited to resistors, capacitors, diodes, transistors, etc. that are connected via metal layers.

Due to the small size of these components, electrical connectivity to the integrated circuit is provided using the presence of several "pads" or metallic layers large enough to be connected with small wires or probes. These "pads" are normally placed on the functionalized side of the integrated circuit.

The back side of the integrated IC is usually connected to the ground reference and presents no particular interest at electronic level. In the present CC-Tag, one large metallic pad is place on the functionalized side of the IC and the back side of the device provides a second pad. This structure allows the device to be freely positioned onto a surface without any need for a precise positioning or angular orientation and it the device may function regardless of which side the CC-tag is deposited onto a surface. This important feature simplifies the deposition process and reduces the related costs.

The IC may be formed using CMOS (complementary MOS) technology (i.e. silicon-based technology). Due to the presence of both n-type and p-type MOS on the same silicon substrate, a well-known effect known as "latch-up" may arise. This can be caused by a parasitic thyristor intrinsically existing in the CMOS structure, which can be triggered on by unexpected voltage spike and create a short-cut conduction between positive and negative contacts of a power supply of the device. This effect is normally reduced by placing extra ground contacts onto the substrate. This effect can be even stronger with CC-Tags due to the presence of a radio frequency (RF) signal coming from the back-side pad (i.e. semiconductor), which may be connected to a virtual ground of the IC. In order to avoid this effect, extra ground contacts may be placed in proximity of the MOS transistors. Alternatively, other semiconductors may be used such as gallium arsenide, graphene, germanium and silicon carbide, for example.

In this example CC-Tag, the back-side of the integrated circuit (i.e. plain semiconductor substrate) is used as a potential electrical pad and is placed close to a second large pad on the top (opposite side) of the functionalized surface. In this example, the structure takes to the form of a thin plate (with a first and opposite surfaces). The system consists of an integrated circuit with one pad on the top and one on the bottom (or the other way round depending on any particular orientation), which can be used as capacitor plates from an ad-hoc developed reader.

The reader can communicate with the CC-Tag via a modulated electric field (Capacitive Coupling) without requiring electrical continuity between the reader and the tag.

Standard RFID tags have their input stage, composed of an inductor acting as an antenna and a tuning capacitor, tuned at the transmission frequency in order to optimize the signal transfer. CC-tags, on the contrary present only a capacitor at the input stage. Capacitors at high frequency present a short-cut behaviour; the cut-off frequency at which this behaviour is visible depends on the value of the capacitor itself and on the value of parasitic resistance of the circuit. This approach presents an important advantage, since the coupling capacitors are required to be just "high enough" in order to present a short-cut behaviour, without need for a precise tuning of the capacitor itself. This results in much lower dependence on the process parameters fluctuation in the deposition step.

For the same reason, CC-tags can even work at different frequencies at the same time, in general the higher the better. The solution shown in the figures (described in more detail below) offer several advantages:

The tag is extremely simple to manufacture, cheap and very robust. It can easily be fabricated along with standard integrated circuit technology.

It does not require special alignment on the item to be tagged, which in turn reduces the complexity and cost of fabrication.

The CC-Tag can also be read when in a stack, when it implements an anti-collision protocol for tags and reader.

CC-Tags can be thinned down below 50 µm to result in an ultra-thin and flexible tag that can be enclosed in a variety of applications such as but not limited to banknotes, official and government documents, tax stamps, visas, holograms as well as any packaging of any goods, paper etc.

FIG. 1 shows a schematic diagram of a capacitive-coupled tag 10 (CC-Tag) being energised by and read by a tag reader 20. The tag reader 20 includes electrodes 30 that provide an electric field 70 by generating a radio frequency (RF) signal. This RF signal can be modulated and detected by the capacitive-coupled tag 10. As shown in this figure, the upper or top surface of the capacitive coupled tag 10 has an electrode 40, which is metallic. The opposite or bottom surface of the capacitive-coupled tag 10 is left bare and forms a semiconductor electrode surface 50. Within or on the surface of a semiconductor substrate of the capacitive-coupled tag 10 is a circuit (i.e. an integrated circuit) 60 (not shown in detail in this figure). The electric field 70 is illustrated by arrows between the electrodes 30 of the reader 20. The metal may be aluminium, copper, gold, silver or a combination of separate metal layers (e.g. gold on aluminium). The IC may be fabricated upon or within the surface of the CC-tag 10 that does not have the metallic pad (i.e. the semiconductor pad surface). Preferably, the surfaces are parallel and planar.

Figure 2:
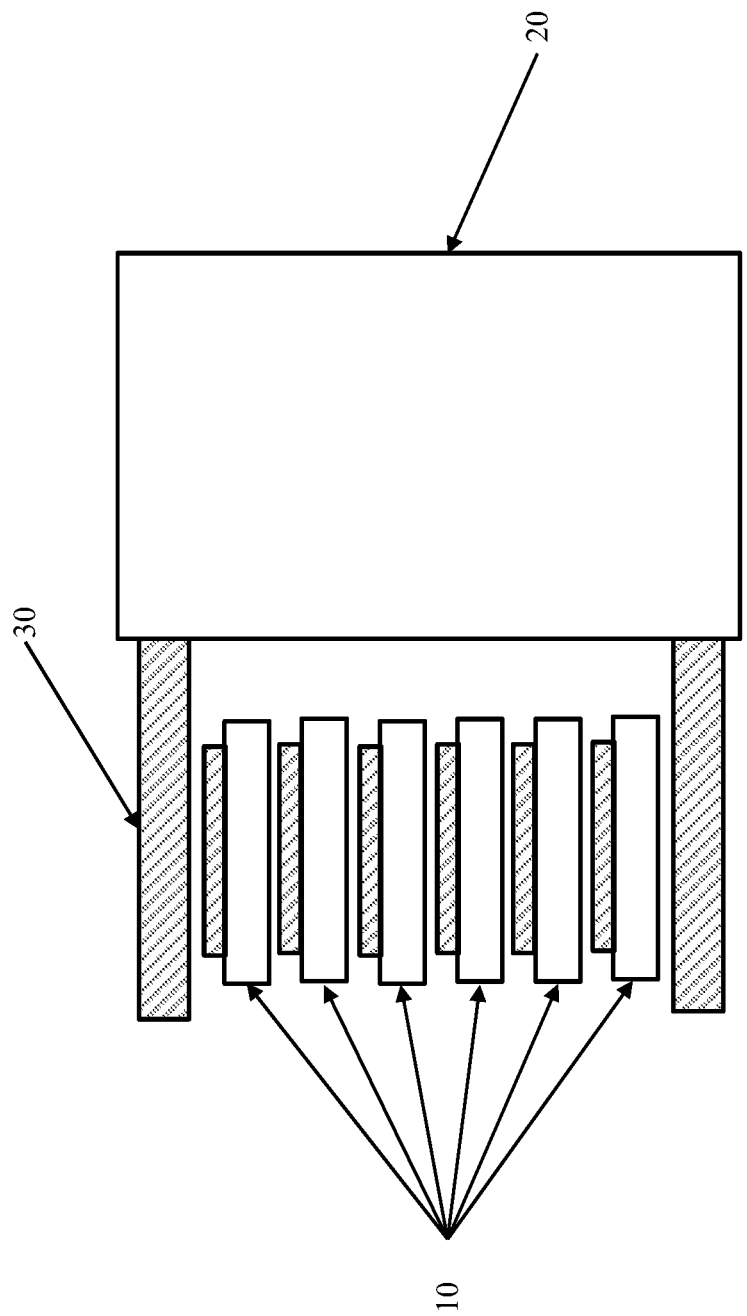
FIG. 2 shows a schematic diagram of a plurality of capacitive-coupled RFID tags of FIG. 1 being read by the reader.
Figure 7:
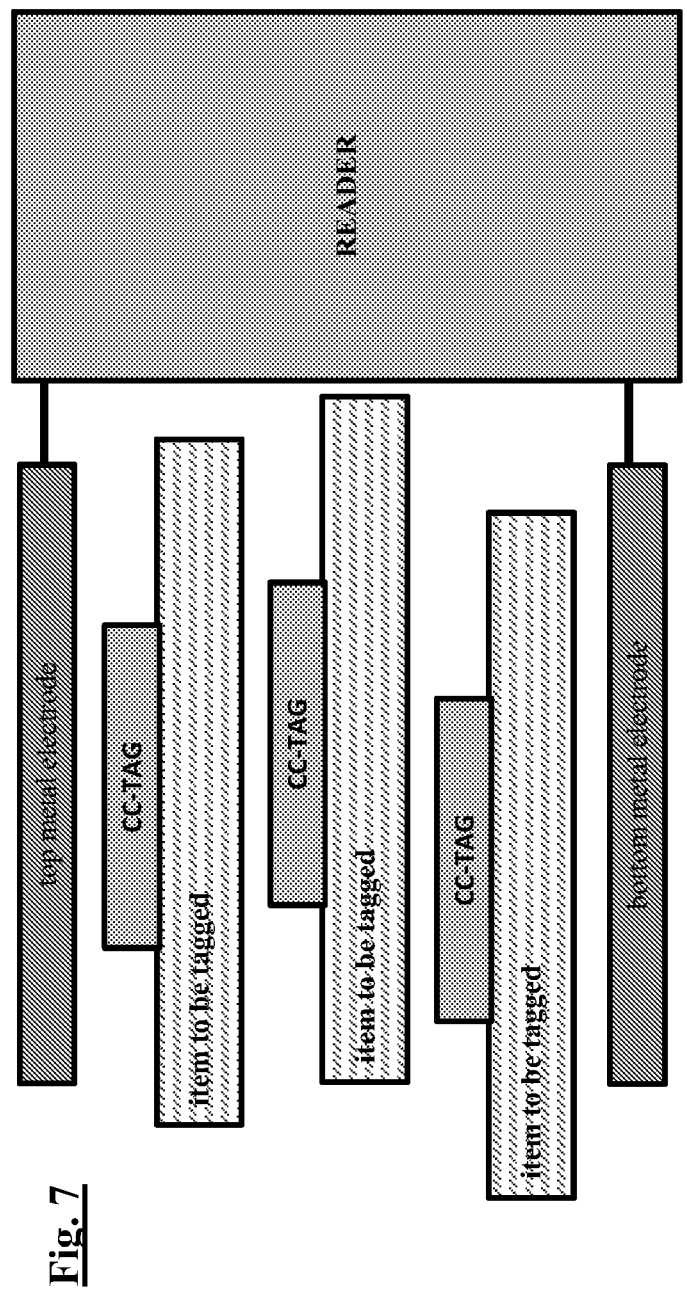
FIG. 7 shows a schematic diagram of a further plurality of capacitive-coupled RFID tags (each attached to an item) being read by a reader.

FIG. 2 shows a further schematic diagram of a plurality of capacitive-coupled tags 10, which are of the same form as shown in FIG. 1. Again, the reader 20 applies an electric field between its electrodes 30 to read each of the capacitive-coupled tags 10. This figure does not show any items or substrates attached to each CC-tag 10 to simplify the figure but this will be present. FIG. 7 shows an equivalent arrangement including the items to be tagged attached to each CC-Tag 10 in the stack. It is noted that it is not necessary for the CC-Tags 10 to be aligned perfectly to be read by the reader.

When there are more than one CC-tags 10 between the electrodes of the reader 30 then all but one of the CC-tags 10 responds to the incident RF input signal by modulating it (i.e. by altering its own impedance to provide a data signal). The remaining CC-tags may optionally reduce their impedance by for example, shorting their pads (metallic and semiconductor surfaces). This makes them electrically invisible to the reader. When the first CC-tag has provided its data signal it stops modulating the input RF signal and shorts its own pads. Then another CC-tag responds to the input RF signal by modulating it as described above. The process continues until all CC-tags have provided their data. Therefore, the CC-tags can be stacked one above another without reducing the signal strength.

Separate CC-tags may communicate with each other to decide which one will respond to the signal. This may be achieved using an anti-collision algorithm, which can generate a random delay that results in a different time for the transmission of each tag. Alternatively, no communication is required and each CC-tag may respond to the input RF signal after a different (e.g. random) delay, which substantially reduces the risk of any two CC-tags responding at the same time (the actual transmission time may be short compared with the delay times).

Shorting the pads may be achieved by a transistor or transistors changing its status from "blocked" to "saturation" to act as an on/off switch, for example.

Further alternative implementations may be used. These may include any one or more of the following alternatives or advantages:

CC-Tags 10 can be embedded in ultra-thin structures or on their surface (such as paper sheets, banknotes, holograms, stamps, etc.), without requiring any antenna, alignment or specific positioning.

CC-Tags 10 require no metallic contact with a reader. The Radio Frequency (RF) signal can go from the reader to the CC-tag 10 even through insulated layers providing these to be thin (less than a mm).

A CC-Tag 10 may draw power from a reader when the reader is within reading distance. The CC-Tag 10 may respond by modulating the impedance between top and bottom electrodes (on/off switching).

A CC-Tag 10 does not work on a circuit resonance and does not suffer of frequency detuning issues hence it is far more robust to production parameter fluctuations.

CC-Tags 10 can be read whilst in a stack, provided they are aligned in the stack, or can be Capacitive-Coupled using an extra metallic layer placed onto the thin structure.

CC-Tags 10 may be equipped with an anti-collision solution to avoid two or more tags communicating with the reader at the same time.

When CC-Tags 10 are read in a stack, then they may follow the following procedure:

Receive power supply and data from the reader for a certain time (charge time).

If a tag is supposed to answer, it may modulate its impedance to communicate with the reader.

If a tag is not supposed to answer, it may reduce its output impedance to a low level (switch on) to allow the reader signal to pass through to the tag that is targeted to answer. When CC-Tags 10 are read whilst in a stack, they are electrically "in series" with each other. This means that the voltage across the stack is divided by the number of elements in the stack. The reader may provide an Adaptive Voltage in order to provide each CC-Tag 10 with enough voltage or power to operate. This may involve increase the applied electric field (e.g. voltage and/or power) to a level so that all of the CC-tags can be energised, for example. It should be noted that the CC-Tag 10 may be placed in any orientation between the reader electrodes. For example, the first electrode may be up or down and the second electrode may be down or up. Different CC-Tags 10 placed in a stack may be placed in either orientation, which may be different for CC-Tags 10 within the same stack.

Figure 3:
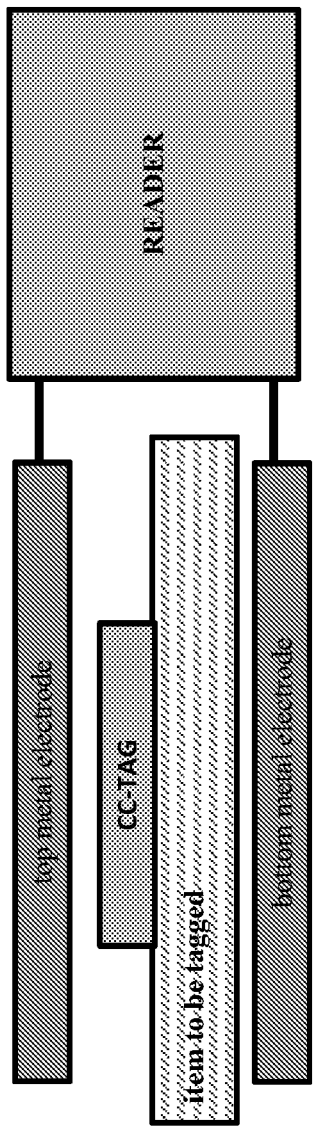
FIG. 3 shows a schematic diagram of a further capacitive-coupled RFID tag being read by a reader.

The preceding examples describe a CC-Tag reading technique in which the tag or series of tags is or are "clamped" or preferably placed closely between two reader electrodes (e.g. part of the reader). This approach has particular applicability to items to be tagged such as thin structures like paper, banknotes, etc. (as shown in FIG. 3) on or in which the CC-Tag 10 is located.

Figure 4:
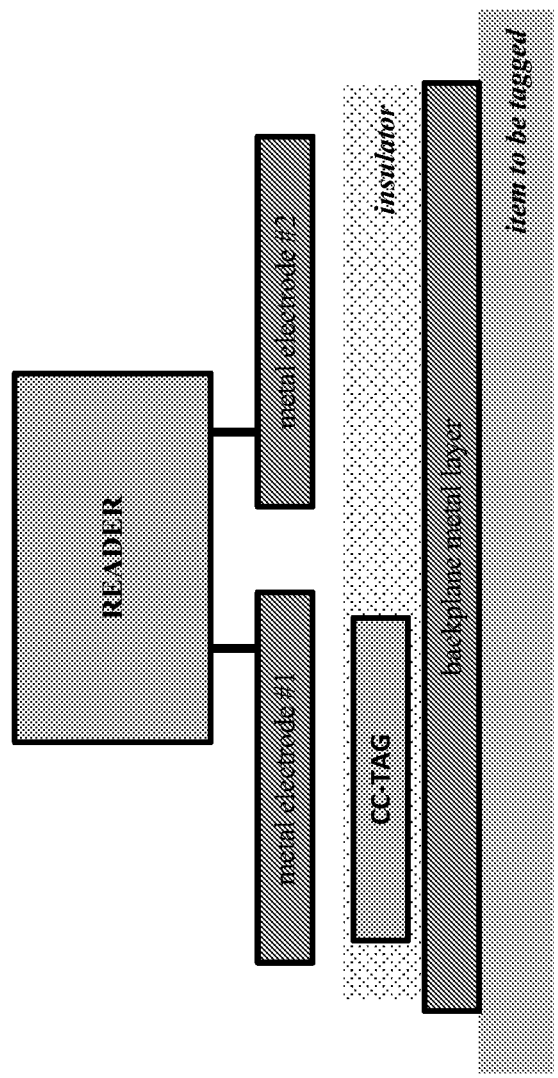
FIG. 4 shows a schematic diagram of a further capacitive-coupled RFID tag being read by a reader.

In a further example implementation, a "single-side" readout may be used. This example implementation avoids the need to place reader electrodes either side of an item and so can be used with larger or thicker objects. This is achieved by adding an extra metal layer (e.g. a suitable conductor like aluminium, copper, silver or gold) behind the CC-Tag on the item, as shown in FIG. 4. FIG. 4 shows a CC-Tag positioned on the top side of an item but the CC-Tag can also be positioned on the side or underneath the item. The CC-Tag used with this example implementation can be the same or substantially similar to that previously described.

The metal layer extends or overlaps beyond the extent of the CC-Tag 10 in at least one direction. Two electrodes are again used with the reader. Electrode #1 is positioned over the CC-Tag 10 (and part of the metal layer) on the object. Electrode #2 is positioned to substantially avoid the CC-Tag 10 but over or align with another part of the metal layer that is not beneath or aligned with the CC-Tag 10. Therefore, the electrodes can be placed on the same side of the item yet allow capacitive coupling with the CC-Tag 10. In other words, the reader, CC-Tag 10 and item are arranged with a first reader electrode, then a CC-Tag 10 (e.g. directly below the first electrode), then a continuous metal layer, then the item to be tagged. The second reader electrode is adjacent the first electrode with the same metal layer between the second electrode and the item. In an example implementation, the CC-Tag 10 may be embedded or partially embedded in an insulator layer (e.g. a polymer or other dielectric) placed on and substantially covering the metal layer, as shown in FIG. 4. The insulator layer (or a portion of it may be directly between the CC-Tag 10 and the metal layer).

Figure 5:
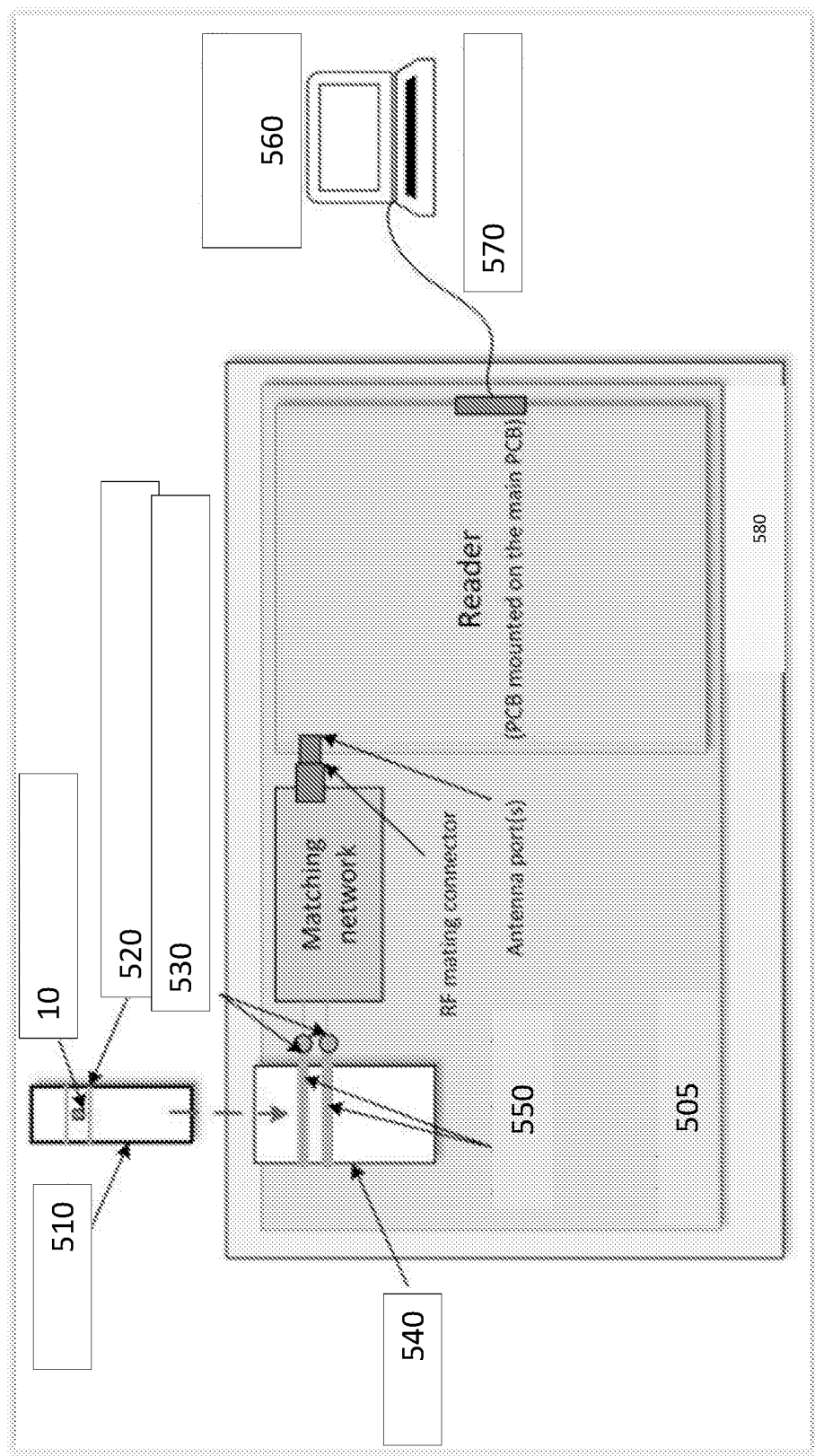
FIG. 5 shows a schematic diagram of a system including any of the capacitive-coupled RFID tags and readers of FIGS. 1 to 4 applied to a cigarette or an electronic cigarette (or other object)

Several example uses of the CC-Tag 10 are described above. A further example is the use of the CC-Tag 10 (of any type described above) in consumables such as electronic or e-cigarettes, beverage capsules, etc. FIG. 5 shows an example implementation of this with the CC-Tag 10 incorporated into one part (e.g. an exchangeable part such as a tobacco plug or stick 510) of an e-cigarette and a reader (or in the example, reader electrodes 550) placed in another part of the e-cigarette 540. Therefore, the reader can verify whether or not it has a correct or legitimate replacement part present.

In this example, the conductive electrode maybe printed on or integrated in paper, e.g., an outer paper of the e-cigarette, with the CC-Tag 10 integrated either in a hollow acetate tube or in a polymer film filter. The reader electrode or electrodes 550 may be integrated in the e-cigarette casing tip (ejector side). The reader electronics may be integrated in the same volume as existing control electronics of the e-cigarette, for example.

In the example system of FIG. 5, electrodes 520 may also be placed on the tobacco plug 510. However, the CC-Tag 10 may also operate without such external electrodes. A printed circuit board 505 may be used to mount various components of the system so that the reader electrodes 550 and associated contacts 530 may couple (e.g. using RF communication) with the reader. These portions of the system may be housed in a case 580 and electrically couple (e.g. using a USB connector 570) to provide data and power connectivity with a computer or microprocessor 560.

FIG. 6a shows in more detail how such a CC-Tag 10 may be formed with a cigarette or an electronic cigarette (or other cylindrical object) 605. This figure illustrates schematically how the metal backplane or metal plate 620 conforms to the curved surface of an electronic cigarette 605 (e.g. a cylinder) and the insulating layer 610 separating this metal plate 620 from the CC-Tag 10. This figure also shows an electrode 630 of the reader surrounding the electronic cigarette 605 and CC-Tag 10.

FIG. 6b illustrates schematically how such a CC-Tag 10 (with a metal back electrode or backplane metal layer similar to that shown in FIG. 4) can be read within ring-shaped metal reader electrodes (550, 550') that surround the cigarette or electronic cigarette 605. Such electrodes operate in a similar way to those described above.

Such CC-Tags 10 (i.e. those that may be read by single sided or adjacent electrode readers) may be more easily read when applied to items such as labels, packaging, holograms, coatings (e.g. tablet coatings), other pharmaceutical products and irregular or non-flat items. FIG. 6b shows how the metal plate 620 extends beyond the substrate and/or metal pad of the CC-Tag 10 so that one reader electrode 550' covers the metal plate 620 but not the rest of the CC-Tag 10 and the other reader electrode 550 covers the rest of the CC-Tag 10. The metal plate therefore capacitively couples signals to the far or opposite electrode of the CC-Tag 10 (i.e. on its other or opposite side to that where the reader electrodes are located).

Whilst FIGS. 5, 6a and 6b are shown with the particular CC-Tag 10 described throughout this description, a similar configuration (i.e. the electrode configuration) may be used with different capacitive-coupled tags.

In an example implementation, the metallic plate may instead be formed from part or all of the item or object that the tag is applied to. For example, the object may be a metal or foil capsule, can, tin or carton having a product enclosed.

The item may be a disposable or reusable, for example. This may be a beverage, coffee or tea capsule having an aluminium body. In these examples, the item itself (or at least a metal container) may have the same function as the metallic plate and capacitively couple to one of the reader electrodes avoiding the need for an electrode either side of the CC-Tag 10 and also improve the use of the CC-Tag 10 when applied to conductive items.

A problem that is solved is the integration of a capacitive tag composed of a capacitive chip and an electrode into a tobacco stick for high volume manufacturing, for example.

The back electrode of the capacitive tag may be incorporated within paper, which is rolled around the tobacco stick (e.g., by printing or inter-leasing of a metallic conductor), stamp the capacitive chip on top of the electrode (alternatively with the addition glue for greater holding strength) and roll over the assembly with a mouth piece paper for holding the capacitive chip (CC-Tag) in position.

Such an assembly has an advantage of being integrated into current manufacturing processes for cigarettes or e-cigarette tobacco sticks.

Alternatively, the back electrode can be integrated either in a hollow acetate tube, cellulose acetate mouthpiece or around the polymer film filter cooler (see below). The capacitive chip (i.e. any CC-Tag described throughout) can then be stamped into one of the three listed components. The position of the chip will then be maintained by the paper rolled around the tobacco stick.

Alternatively, and in addition to the integration of the electrode in one of the hollow acetate tube, cellulose acetate mouthpiece, around the polymer film filter cooler and paper, a second electrode can be integrated within the paper rolled around the tobacco stick, resp. paper for mouth piece, whereas the second electrode preferably only partially covers the first one. In such a configuration, the first electrode is in contact or close to the back electrode of the capacitive chip (CC-Tag), and the second electrode is in contact or close to the top electrode of the capacitive chip, leading to an improved reading sensitivity of the capacitive tag (CC-Tag).

As will be appreciated by the skilled person, details of the above embodiment may be varied without departing from the scope of the present invention, as defined by the appended claims.

For example, the CC-tags and readers may be operated using standard industrial, scientific and medical (ISM) radio band frequencies (i.e. the frequency of the input RF signal). The frequency of operation may be 13.56 MHz (or between 10 MHz and 15 MHz), for example. CC-tags may operate at separate frequencies (i.e. to avoid collision of data signals). The reader may scan different frequencies, for example.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A capacitive coupled radio frequency identification, RFID, tag comprising:
    a semiconductor substrate having a first planar surface and a second planar surface distal from the first planar surface;
    a metallic pad formed on the first planar surface of the semiconductor substrate;
    a circuit formed on the semiconductor substrate and electrically connected to the metallic pad and the second planar surface of the semiconductor substrate, the circuit configured to respond to a radio frequency, RF, input signal by providing a data signal encoded by varying an impedance between the metallic pad and the second planar surface of the semiconductor substrate; and
    a metallic plate, wherein the metallic plate extends beyond at least one edge of the metallic pad.

2. The capacitive coupled RFID tag of claim 1, wherein RF input signal is provided by an external reader.

3. The capacitive coupled RFID tag of claim 1, wherein the circuit is further configured to be powered by the RF input signal.

4. The capacitive coupled RFID tag of claim 1, wherein the circuit is further configured to decode a signal encoded within the RF input signal and further wherein the data signal is provided in response to the decoded signal.

5. The capacitive coupled RFID tag of claim 1, wherein the circuit modulates the RF input signal by varying its frequency, amplitude and/or phase.

6. The capacitive coupled RFID tag of claim 1, wherein the circuit is formed on the second planar surface of the semiconductor substrate.

7. The capacitive coupled RFID tag of claim 1, wherein the circuit is configured to vary the electrical impedance between the metallic pad and the second planar surface of the semiconductor substrate by applying a short circuit between the metallic pad and the second planar surface of the semiconductor substrate.

8. The capacitive coupled RFID tag of claim 1, wherein a distance between an outside surface of the metallic pad and the second planar surface of the semiconductor substrate is equal to or less than 100 μm.

9. The capacitive coupled RFID tag of claim 1, wherein the circuit is further configured to detect the presence of one or more further capacitive coupled RFID tags and in response, cease providing the data signal.

10. The capacitive coupled RFID tag of claim 9, wherein the circuit is configured to cease providing the data signal by applying a short circuit between the metallic pad and the second planar surface of the semiconductor substrate, and wherein the circuit is configured to cease providing the data signal until the one or more further capacitive coupled RFID tags have provided their data signal.

11. The capacitive coupled RFID tag of claim 9, wherein the circuit is further configured to cease providing the data signal according to an anti-collision protocol, wherein the anti-collision protocol is based on communications between the one or more capacitive coupled RFID tags:
    according to a pre-determined order of response, according to a negotiated response between the one or more capacitive coupled RFID tags, or a random number generator.

12. The capacitive coupled RFID tag of claim 1, wherein the first planar surface is parallel with the second planar surface, and/or, wherein the capacitive coupled RFID tag is flexible.

13. The capacitive coupled RFID tag of claim 1 further comprising an insulator bonded between the tag and the metallic plate, wherein the insulator is bonded to the metallic pad of the tag, or wherein the insulator is bonded to the second planar surface of the semiconductor substrate.

14. The capacitive coupled RFID tag of claim 1, wherein the metallic plate is curved.

15. An item having the capacitive coupled RFID tag according to claim 1 embedded within it.

16. The item of claim 15, formed from paper, formed from plastics material, is a bank note, a cigarette, an electronic cigarette, a label, a tablet, a pharmaceutical product, a beverage capsule, a coffee capsule, a tea capsule, a metal container, a hologram, a passport, an ID card, a tax stamp and/or a legal document.

17. The tag of claim 1, wherein the metallic plate is on a side of the capacitive coupled RFID tag opposite the first planar surface such that the metallic pad and the metallic plate are on opposite sides of the capacitive coupled RFID tag, and
   wherein the metallic plate extends beyond at least one edge of the metallic pad and/or the semiconductor substrate.

18. A system comprising:
   one or more capacitive coupled radio frequency identification, RFID, tag comprising:
      a semiconductor substrate having a first planar surface and a second planar surface distal from the first planar surface;
      a metallic pad formed on the first planar surface of the semiconductor substrate;
      a circuit formed on the semiconductor substrate and electrically connected to the metallic pad and the second planar surface of the semiconductor substrate, the circuit configured to respond to a radio frequency, RF, input signal by providing a data signal encoded by varying an impedance between the metallic pad and the second planar surface of the semiconductor substrate; and
      a metallic plate, wherein the metallic plate extends beyond at least one edge of the metallic pad; and
   a reader comprising an RF signal generator and decoder configured to decode the data signal.

19. The system of claim 18, wherein the reader further comprises:
   a first electrode configured to align with the metallic pad and/or semiconductor substrate of the tag; and
   a second electrode configured to align with a portion of the metallic plate that extends beyond the at least one edge of the metallic pad and/or the semiconductor substrate.

20. The system of claim 19, wherein the first electrode and the second electrode are curved.

21. The system of claim 20, wherein the metallic plate is formed from a metallic package of a can, tin, coffee capsule, tea capsule or beverage capsule.

22. The system of claim 18, wherein the metallic plate is on a side of the capacitive coupled RFID tag opposite the first planar surface such that the metallic pad and the metallic plate are on opposite sides of the capacitive coupled RFID tag, and
   wherein the metallic plate extends beyond at least one edge of the metallic pad and/or the semiconductor substrate.

* * * * *